No. 617,063. Patented Jan. 3, 1899.
F. TIEMANN.
REVOLVING HARROW.
(Application filed Mar. 22, 1898.)
(No Model.) 3 Sheets—Sheet 1.

No. 617,063. Patented Jan. 3, 1899.
F. TIEMANN.
REVOLVING HARROW.
(Application filed Mar. 22, 1898.)
(No Model.) 3 Sheets—Sheet 2.

Witnesses Inventor
Fred Tiemann.
by
Attorneys

No. 617,063. Patented Jan. 3, 1899.
F. TIEMANN.
REVOLVING HARROW.
(Application filed Mar. 22, 1898.)

(No Model.) 3 Sheets—Sheet 3.

Witnesses
Inventor
Fred Tiemann.
by H. B. Willson & Co.
Attorneys

THE NORRIS PETERS CO., PHOTO-LITHO., WASHINGTON, D. C.

UNITED STATES PATENT OFFICE.

FRED TIEMANN, OF BASCO, ILLINOIS.

REVOLVING HARROW.

SPECIFICATION forming part of Letters Patent No. 617,063, dated January 3, 1899.

Application filed March 22, 1898. Serial No. 674,806. (No model.)

*To all whom it may concern:*

Be it known that I, FRED TIEMANN, a citizen of the United States, residing at Basco, in the county of Hancock and State of Illinois, have invented certain new and useful Improvements in Revolving Harrows; and I do declare the following to be a full, clear, and exact description of the invention, such as will enable others skilled in the art to which it appertains to make and use the same.

The invention has relation to revolving harrows; and the object is to provide a machine of this character with simple mechanism for revolving the harrow-reel in contact with the ground, thereby more thoroughly breaking the clods and stirring the soil.

With this object in view the invention consists in certain features of construction and combination of parts, which will be hereinafter fully described and claimed.

Figure 1:
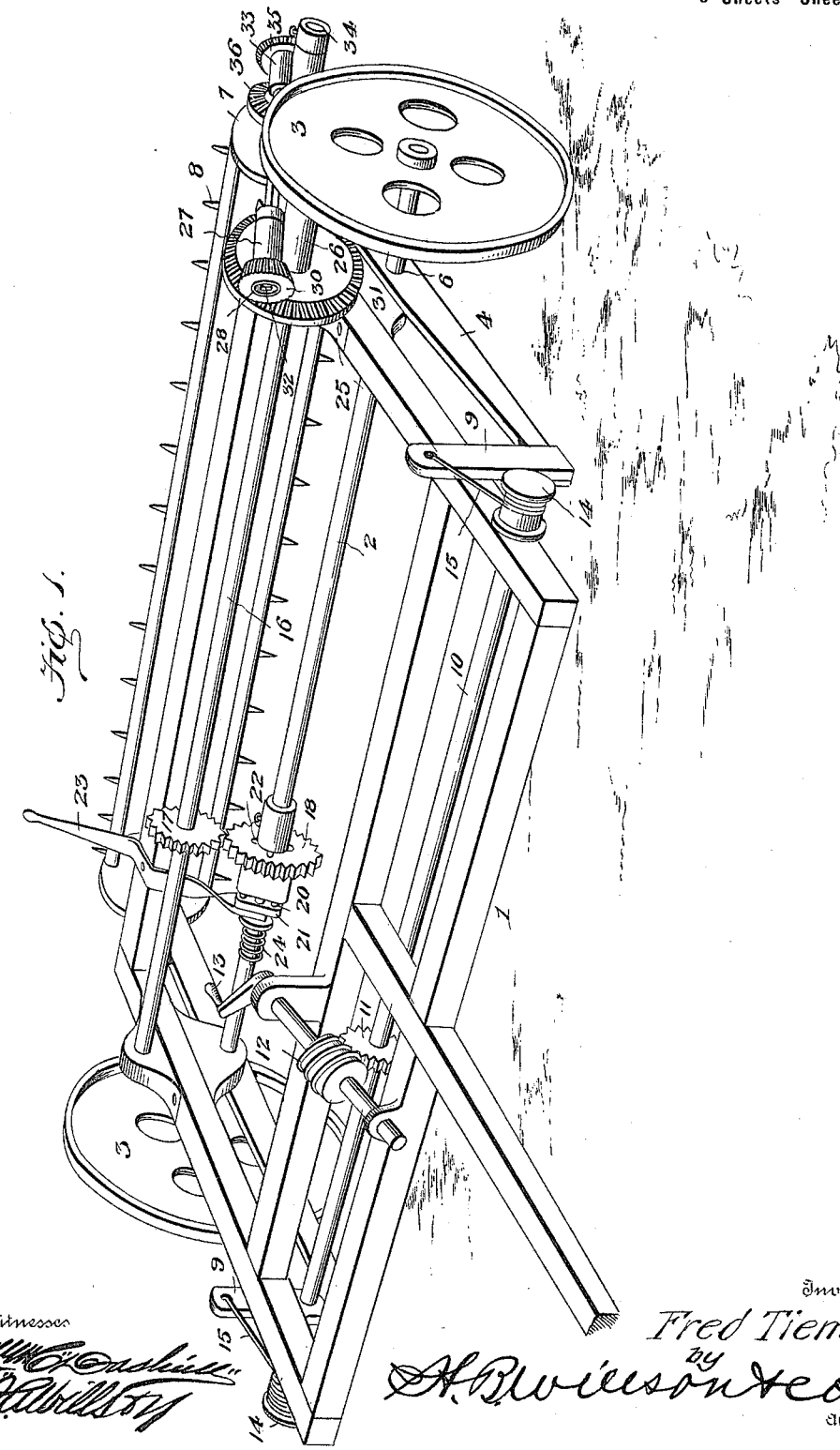
Figure 2:
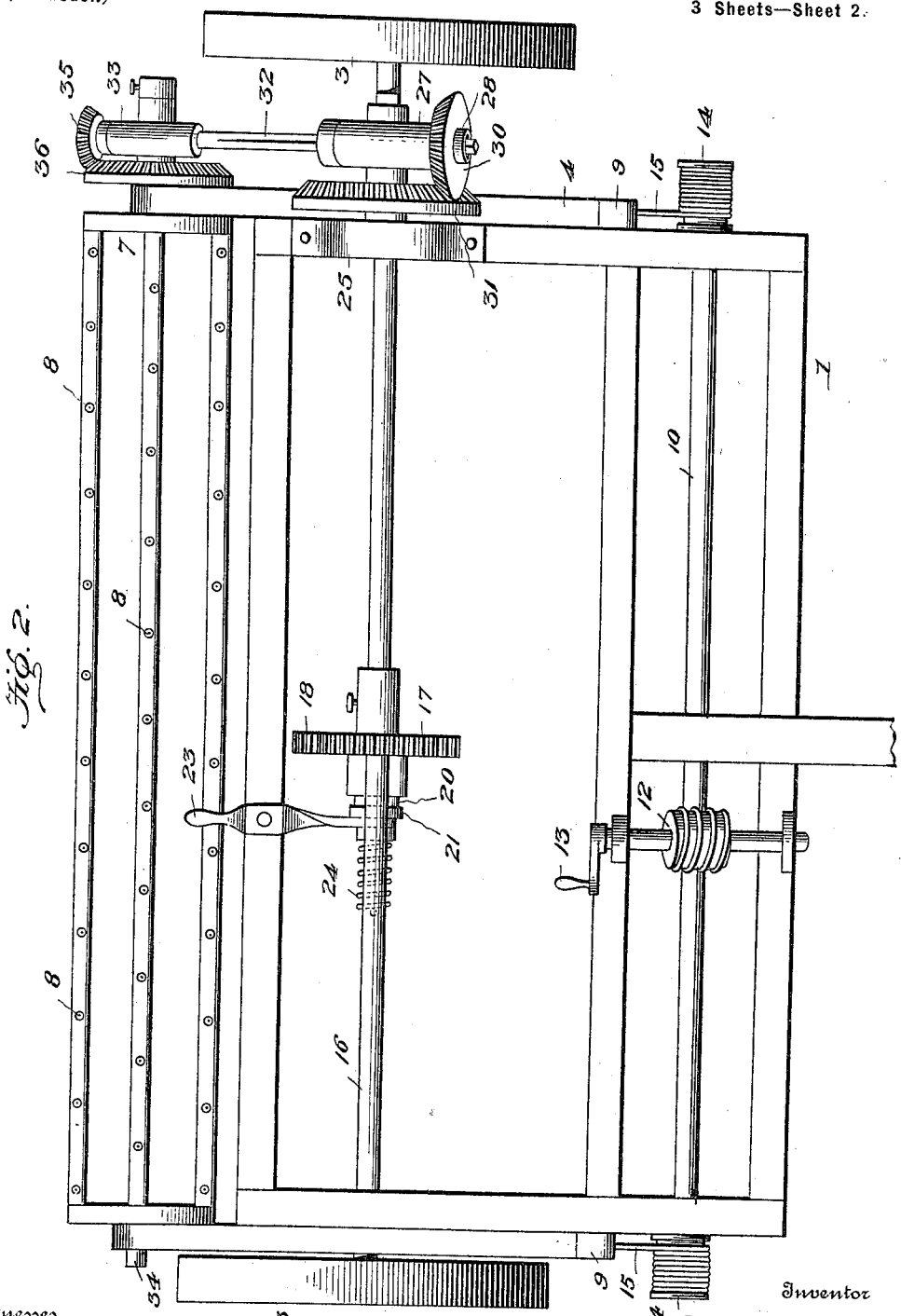
Figure 3:
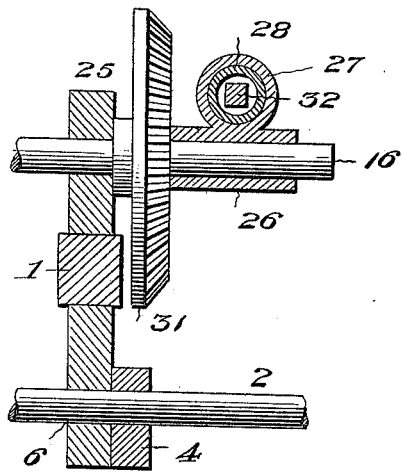
Figure 4:
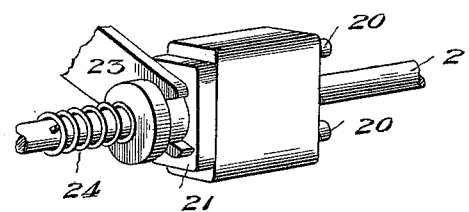
Figure 5:
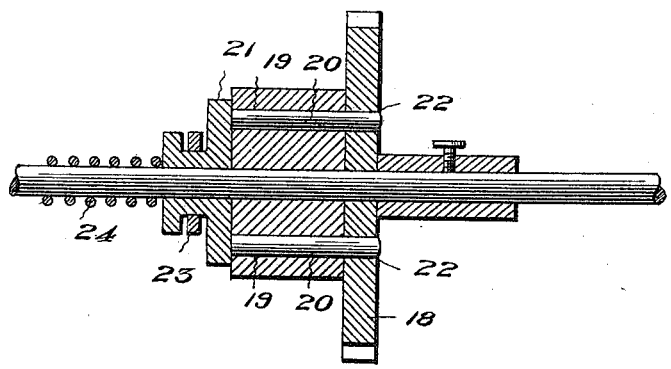

In the accompanying drawings, Figure 1 is a perspective view of my improved harrow, looking from the right-hand side of the machine. Fig. 2 is a top plan view. Fig. 3 is a longitudinal sectional view through one of the boxes and parts supported thereby. Fig. 4 is a detail perspective view of the clutch mechanism, and Fig. 5 is a longitudinal sectional view through the clutch mechanism.

In said drawings, 1 denotes the rectangular frame of the harrow, journaled upon a shaft 2, having supporting-wheels 3 fixed to its outer ends.

4 denotes the harrow-reel frame, which is pivoted at 6 to the shaft and has journaled between its rear ends a harrow-reel 7, provided with harrow-teeth 8.

9 denotes posts or standards secured to the forward ends of the reel-frame.

10 denotes a shaft journaled across the front end of the main frame and provided with a worm-wheel 11, engaged by a worm 12, operated by a crank 13, which extends within convenient reach of the driver. The free ends of the shaft 10 are provided with winding-drums 14, and ropes or cables 15 are wound around these drums and connected to the posts 9. It is evident that when the worm is rotated the shaft will also be rotated, thus winding the cable or rope around the drum and raising or lowering the harrow-reel, according to the direction of movement of the worm. This will enable the machine to be moved from one place to another without the harrow-teeth digging into the rows.

It is desirable to positively rotate the harrow-reel—that is to say, to impart to it a rotary movement other than that which would naturally be transmitted to it by dragging the reel along the ground. I prefer to impart this positive motion to the harrow-reel for the reason that the clods will be more thoroughly crushed or disintegrated and the ground more thoroughly stirred.

The mechanism for rotating the reel is simple, strong, and durable, and I shall now proceed to describe it.

Journaled in the main frame of the machine above its shaft 2 is a shaft 16, provided with a gear-wheel 17 in mesh with a gear-wheel 18, having a loose connection with the shaft 2, but adapted to be caused to rotate the said shaft by a novel clutch mechanism, which consists of a block having a fixed engagement with the shaft 2, and having transverse apertures 19, that receive the pins 20 on the head 21, that has a sliding engagement on the shaft 2. These pins extend into holes 22 in the wheel 18, and thus lock the wheel to the shaft to turn therewith. A lever 23 is pivoted to the frame and has a forked lower end that engages the sliding head, whereby the pins may be withdrawn from the wheel 18, so as to release said wheel from the shaft. A coiled spring 24 is placed upon the shaft 2 and exerts its energy to hold the pins in engagement with the wheel 18.

25 denotes a journal-box having a sleeve 26, journaled upon the end of the shaft 16, and the integral sleeve 27, that extends at right angles to the sleeve 26. 28 denotes a tubular shaft journaled in the sleeve 27 and having at one end a retaining-collar 29 and at the other end a bevel-gear 30, that meshes with the gear 31, secured to the end of the shaft 16.

32 denotes a solid shaft polygonal in cross-section that extends through the bore of the hollow shaft, which bore, being correspondingly shaped, causes the polygonal shaft to rotate when the hollow shaft is rotated. The lower rear end of the polygonal shaft is journaled in a bearing 33, which is supported upon the axis 34 of the harrow-reel and is provided with a miter-pinion 35, that meshes with a miter-wheel 36, fixed to the axis of the harrow-reel.

In operation as the machine is drawn along and the shaft 2 rotated this movement will be transmitted to the shaft 16 and, through the intermediate mechanism herein described, to the harrow-reel, thus forcing its teeth into the clods and soil, pulverizing the clods and stirring the soil.

When the machine is moved along the road from one field to another, it is of course not desirable to have the teeth come in contact with the road for obvious reasons, so I elevate the reel out of contact with the ground. The reel being journaled in a frame, which is journaled to the shaft 16, will move in the arc of a circle in the act of being elevated, and in order to permit this movement, without throwing the driving mechanism at the left-hand end of the machine out of gear, is the reason I provide the polygonal shaft and the hollow shaft, the former being free to slide in the latter, but constructed to rotate in unison therewith.

Although I have specifically described the construction and relative arrangement of the several elements of my invention, I do not wish to be confined to the same, as such changes or modifications may be made as clearly fall within the scope of my invention without departing from the spirit thereof.

Having thus described my invention, what I claim, and desire to secure by Letters Patent, is—

1. In combination, the main frame, the drive-shaft journaled therein and provided with fixed supporting-wheels, a reel-frame journaled to said drive-shaft, a reel journaled between the rear ends of the reel-frame, a shaft 16 journaled above the drive-shaft, a gear-wheel loosely mounted upon the drive-shaft and in mesh with a similar gear on the shaft 16 and provided with holes, a block having apertures, said block fixed to the drive-shaft, a sliding head having pins that extend through said block and engage the apertures in the wheel, a shifting-lever for drawing the pins from the apertures in the wheel, a spring for holding the pins in the apertures of the wheel, and mechanism for transmitting the motion from the shaft 16 to the reel, substantially as set forth.

2. In combination, the main frame, a drive-shaft journaled therein and provided with supporting-wheels, a shaft 16 geared to the drive-shaft and provided at one of its ends with a gear-wheel, a reel-frame journaled on the drive-shaft and provided with a harrow-reel, a gear-wheel fixed to the axis of the harrow-reel, a box supported by one end of the shaft 16 and provided with a sleeve that extends at right angles to said shaft, a hollow shaft journaled in said last-mentioned sleeve and provided with an angular bore and with a pinion in mesh with the gear-wheel on the end of the shaft 16, and a shaft extending through the hollow shaft and having a sliding movement therein, said shaft having at its lower end a pinion in mesh with the pinion on the axis of the reel, substantially as set forth.

In testimony whereof I have hereunto set my hand in presence of two subscribing witnesses.

FRED TIEMANN.

Witnesses:
GEO. W. PAYNE,
E. A. PAYNE.